United States Patent [19]

Ohkita et al.

[11] Patent Number: 5,012,366
[45] Date of Patent: Apr. 30, 1991

[54] MAGNETIC HEAD SUPPORTING DEVICE

[75] Inventors: Masao Ohkita; Yasuhiro Akiyama; Makito Takikawa; Yoshihiko Arayama, all of Furukawa, Japan

[73] Assignee: Alps Electric Co., Ltd., Tokyo, Japan

[21] Appl. No.: 515,380

[22] Filed: Apr. 27, 1990

[30] Foreign Application Priority Data

Jul. 5, 1989 [JP] Japan .................................. 1-171817

[51] Int. Cl.$^5$ .............................................. G11B 5/60
[52] U.S. Cl. ..................................... 360/102; 360/104
[58] Field of Search .................. 360/130.34, 102, 103, 360/104, 122

[56] References Cited

U.S. PATENT DOCUMENTS 4,578,727  3/1986  Hills ..................................... 360/102
4,809,105  2/1989  Imanishi et al. ................. 310/130.34

FOREIGN PATENT DOCUMENTS 0148615  7/1986  Japan ..................................... 360/104
0094563  4/1989  Japan ..................................... 360/104

Primary Examiner—David J. Severin
Attorney, Agent, or Firm—Guy W. Shoup

[57] ABSTRACT

A magnetic head supporting device for supporting a magnetic head for writing information in and/or reproducing recorded information from a flexible magnetic disk. The magnetic head supporting device comprises a holding plate for holding the magnetic head, and a base plate attached to the holding plate and fastened to the carriage of a magnetic disk driving apparatus so that the magnetic head is supported opposite to the magnetic disk loaded on the turn table of the magnetic disk driving apparatus. The holding plate is provided in its upper surface with a positive pressure creating section in its front end to create a positive pressure for floating the magnetic disk, a floating section in its radially opposite sides to float the magnetic disk stably, and a negative pressure creating section in its central area to create a negative pressure for attracting the magnetic disk. The magnetic head is disposed in the negative pressure creating section with its extremity slightly penetrating a plane including the floating section.

1 Claim, 2 Drawing Sheets

MAGNETIC HEAD SUPPORTING DEVICE

BACKGROUND OF THE INVENTION

1. Field of the Invention

The present invention relates to a magnetic head supporting device for supporting a magnetic head for recording signals in and/or reproducing recorded signals from a magnetic recording medium having the shape of a disk.

2. Background Art

Magnetic disk driving apparatus for writing information in and/or reading recorded information from a magnetic recording medium having the shape of a disk, i.e., a magnetic disk, are used widely as external storage apparatus for information processing apparatus, such as personal computers and word processors. These magnetic disk driving apparatus are classified roughly into two types. Magnetic disk driving apparatus of the first type are used for driving flexible magnetic disks, i.e., so-called floppy disks, and those of the second type are used for driving rigid magnetic disks, i.e., so-called hard disks. Magnetic disk driving apparatus of the first type are used more widely, because flexible magnetic disks are easy to handle and are comparatively inexpensive.

The magnetic head of a conventional magnetic disk driving apparatus must be projected from the upper surface of a back plate by a large length to dispose the magnetic head with a very small clearance of several micrometers between the surface of the flexible magnetic disk and its extremity for high-density recording. Accordingly, a portion of the flexible magnetic disk corresponding to the magnetic head is deformed greatly to make the rotation of the flexible magnetic disk unstable, and such local deformation causes fatigue and permanent deformation in the flexible magnetic disk.

A magnetic disk driving apparatus disclosed in Japanese Patent No. 58-15870 has been invented to solve those problems in the conventional magnetic disk driving apparatus. This known magnetic disk driving apparatus comprises a slider disposed so that the surface of a rotating flexible magnetic disk extends close to its upper surface, and provided with a negative pressure creating surface having a rear end, with respect to the direction of movement of the flexible magnetic disk, communicating with the atmosphere, outer positive pressure creating surfaces formed respectively on the radially opposite sides of the negative pressure creating surface, and an inner positive pressure creating surface formed in the negative pressure creating surface and provided with an opening for receiving a magnetic head therein.

This slider is able to hold the magnetic head close to the flexible magnetic disk scarcely deforming the flexible magnetic disk. The negative pressure creating surface is sunk by a small depth relative to the outer positive pressure creating surfaces, the inner positive pressure creating surface is formed in the central portion of the negative pressure creating surface, and the magnetic head is embedded in the inner positive pressure creating surface.

When the slider is located in close proximity to the rotating flexible magnetic disk with minute gaps between the outer positive pressure creating surfaces and the flexible magnetic disk and between the inner positive pressure creating surface and the flexible magnetic disk, a positive pressure is created between the outer and inner positive pressure creating surfaces and the flexible magnetic disk and a negative pressure is created between the negative pressure creating surface and the flexible magnetic disk. Thus, radially alternate zones of positive pressure and negative pressure are formed between the slider and the flexible magnetic disk while the flexible magnetic disk is rotated. Accordingly, this magnetic head supporting device has the following advantages.

(1) The magnetic head need not be projected to penetrate a plane including the flexible magnetic disk.

(2) Since the size of the slider is very small as compared with the diameter of the flexible magnetic disk and intervals between the positive pressure creating surfaces and the negative pressure creating surface are very small, the deformation of a portion of the flexible magnetic disk corresponding to the slider is suppressed to a very small extent by the rigidity of the flexible magnetic disk.

(3) Since the flexible magnetic disk is held substantially in a plane during rotation, permanent deformation and fatigue of the flexible magnetic disk are prevented.

Recently, further increase in recording density has been desired. However, it is difficult to achieve a high recording density when the magnetic coupling of the flexible magnetic disk and the magnetic head is established with the least deformation of the flexible magnetic disk. The magnetic head supporting device disclosed in Japanese Patent Publication No. 58-15870 is unable to apply a sufficient loading pressure to the flexible magnetic disk for high-density recording because the slider forms radially alternate zones of positive pressure and negative pressure to suppress the deformation of the flexible magnetic disk, and establishes the magnetic coupling of the magnetic head and the flexible magnetic disk by utilizing the rigidity of the flexible magnetic disk.

SUMMARY OF THE INVENTION

Accordingly, it is an object of the present invention to provide a magnetic head supporting device capable of preventing the fatigue and permanent deformation of the magnetic disk attributable to the varying local deformation of the magnetic disk and enabling enhanced high-density recording.

To achieve the object, the present invention provides a magnetic head supporting device comprising a magnetic head supporting member provided with a sequential downstream arrangement, with respect to the rotating direction of the magnetic disk, of a positive pressure creating section for creating a positive pressure, a disk floating section for stably floating the magnetic disk, and a negative pressure creating section for creating a negative pressure. A magnetic head is disposed in the negative pressure creating section with its extremity slightly penetrating a plane including the floating section.

This magnetic head supporting member curves a wide area of the magnetic disk in a gentle curve to prevent the fatigue and permanent deformation of the magnetic disk, and is capable of being formed in optional dimensions suitable for applying an appropriate loading pressure to the magnetic disk for further enhanced high-density recording.

BRIEF DESCRIPTION OF THE DRAWINGS

The above and other objects, features and advantages of the present invention will become more apparent from the following description taken in connection with the accompanying drawings, in which.

DESCRIPTION OF THE PREFERRED EMBODIMENT

Figure 1:
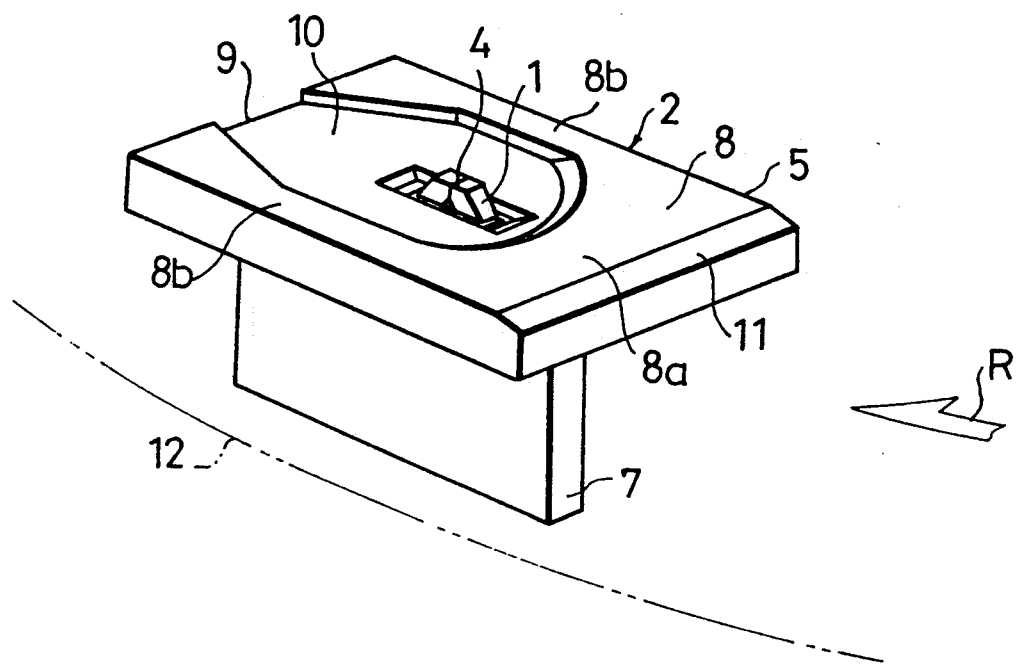
FIG. 1 is a perspective view of a magnetic head supporting device in a preferred embodiment according to the present invention.
Figure 2:
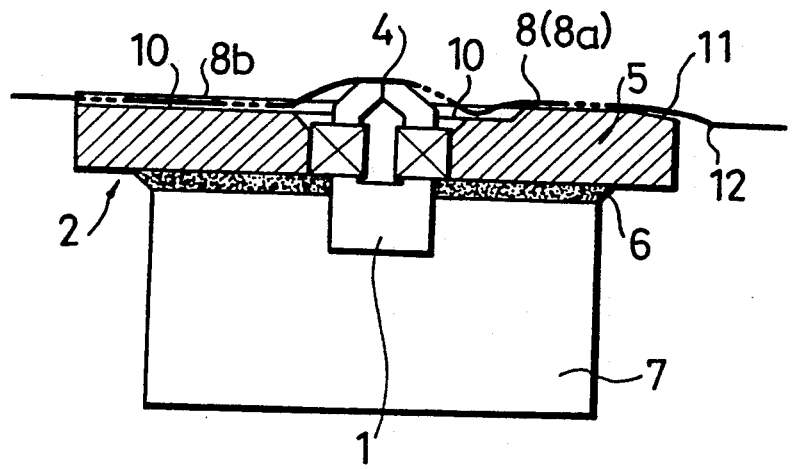
FIG. 2 is a partly sectional view of the magnetic head supporting device of FIG. 1.
Figure 3:
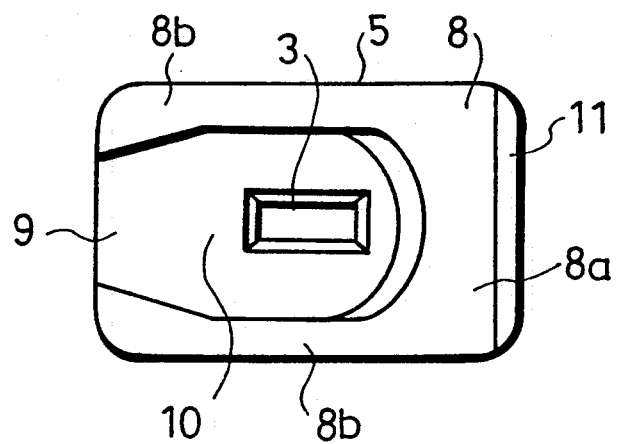
FIG. 3 is a plan view of the magnetic head supporting device of FIG. 1.
Figure 4:
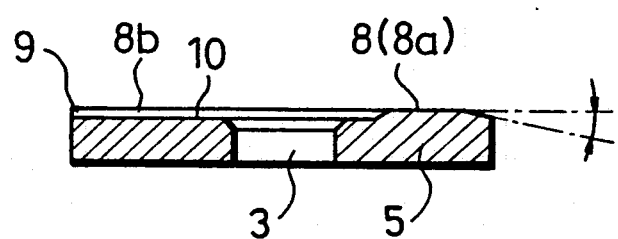
FIG. 4 is a longitudinal sectional view of a magnetic head supporting member included in the magnetic head supporting device of FIG. 1.

Referring to FIGS. 1 and 2, a magnetic head supporting device 2 comprises a substantially rectangular holding plate 5, and a base plate 7 bonded to the lower surface of the holding plate 5 with an adhesive 6. The magnetic head supporting device 2 is mounted on a carriage, not shown, with the base plate 7 fastened to the carriage. A magnetic head 1 is fitted in a hole 3 formed in the holding plate 5 and fixed in place to the holding plate 5 with an adhesive so as to project slightly, namely, by a length on the order of 30 $\mu$m, from the upper surface 8 of the holding plate 5. A portion of the upper surface 8 extending from the central area to the rear end 9, with respect to the rotating direction R of a magnetic disk 12, is removed to form the upper surface 8 substantially in a shape resembling the inverted letter C and to form a recess 10. In this embodiment, the length of the holding plate 5, namely, the length of the sides of the holding plate 5 substantially parallel to the rotating direction R, is 8 mm, the width of the holding plate 5, namely, the length of the sides of the holding plate 5 substantially perpendicular to the rotating direction R, is 5 mm and the depth of the recess 10 is 70 $\mu$m. The recess 10 has a width $H_1$ of 3.6 mm. The width $H_2$ of the open rear end of the recess is 2.4 mm. The front end, with respect to the rotating direction R, of the recess 10 is formed in an arc of a circle of 2.2 mm in radius. Naturally, these dimensions may be changed according to design conditions. As shown in FIGS. 1 and 2, the upper front edge of the holding plate 5 is beveled to form a bevel surface 11 declining to the front, for example, at an inclination $\theta$ of 2°.

The magnetic head supporting device thus constructed is incorporated into a magnetic disk driving apparatus for writing information in and/or reproducing recorded image from a magnetic disk 12, such as a 2 in. diameter still video disk 12 of 23.5 mm in radius and about 14.5 mm in radial width, which is called generally a still video floppy disk for recording information including image information. When a cartridge containing the magnetic disk 12 is loaded on the turntable of the magnetic disk driving apparatus, the magnetic disk 12 is held in proximity to the upper surface of the holding plate 5 of the magnetic disk supporting device 2. As the magnetic disk 12 is rotated at a comparatively high rotating speed, an air current is produced along the surface of the magnetic disk 12. Since the upper surface 8 of the holding plate 5 is spaced closely from the magnetic disk 12, air flowing along the surface of the magnetic disk 12 flows along the bevel surface 11 and is compressed between the front area 8a of the upper surface 8 of the holding plate 5 and the magnetic disk 12, so that a stable positive pressure is created in a space over the front area 8a of the upper surface 8 of the holding plate 5 extending rearward from the bevel surface 11, a stable positive pressure lower than that in the space over the front area 8a is created in spaces over the side areas 8b of the upper surface 8, and a stable negative pressure is created in the recess 10. The positive pressure prevailing over the front area 8a and the positive pressure prevailing over the side areas 8b float the corresponding portion of the magnetic disk 12 so that the magnetic disk 12 is spaced closely from the upper surface 8, and the negative pressure prevailing over the recess 10 tends to attract the corresponding portion of the magnetic disk 12, so that the magnetic disk 12 is curved steadily in a gently curved shape bending away from the holding plate 5 in the vicinity of the front area 8a and the side areas 8b and bending toward the holding plate 5 in the vicinity of the recess 10. Since the extremity 4 of the magnetic head 1 is projecting slightly from the upper surface 8, the magnetic disk 12 is pressed closely to the extremity 4 of the magnetic head 1 at an appropriate loading pressure for stable high-density recording.

Naturally, the dimensions of the recess 10 and the holding plate 5 are determined selectively taking the diameter and flexibility of the magnetic disk 12 into consideration to secure an appropriate loading pressure.

Thus, the magnetic disk 12 is curved gently and steadily in the vicinity of the magnetic head supporting device 2 for stable contact with the magnetic head 1 at an appropriate loading pressure. Therefore, the fatigue and permanent deformation of the magnetic disk 12 due to sharp local deformation are prevented and an appropriate loading pressure can be secured.

Although the invention has been described in its preferred form with a certain degree of particularity, obviously many changes and variations are possible therein. It is therefore to be understood that the invention may be practiced otherwise than as specifically described herein without departing from the scope and spirit thereof.

What is claimed is:

1. A magnetic head supporting device for supporting a magnetic head for writing information in and/or reproducing recorded information from a flexible magnetic disk, comprising: a holding plate for holding the magnetic head; and a base plate attached to the holding plate and fastened to the carriage of a magnetic disk driving apparatus so as to support the magnetic head opposite the flexible magnetic disk loaded on the turntable of the magnetic disk driving apparatus; characterized in that the holding plate is provided with a positive pressure creating section in its front end, with respect to the rotating direction of the magnetic disk, for creating a positive pressure over the surface of the holding plate facing the magnetic disk, floating sections for stably floating the magnetic disk in its radially opposite sides, and a negative pressure creating section for creating a negative pressure in in an area from the central portion to the rear end of the upper surface, and the magnetic head is embedded in the holding plate in the negative pressure creating section with the extremity thereof slightly penetrating a plane including the floating sections.

* * * * *

UNITED STATES PATENT AND TRADEMARK OFFICE
CERTIFICATE OF CORRECTION

PATENT NO.    : 5,012,366
DATED         : April 30, 1991
INVENTOR(S)   : Masao Ohkita et al.

It is certified that error appears in the above-identified patent and that said Letters Patent is hereby corrected as shown below:

Column 4, line 60, Claim 1, delete the second occurance of "in".

Signed and Sealed this

Twenty-ninth Day of September, 1992

*Attest:*

DOUGLAS B. COMER

*Attesting Officer*    Acting Commissioner of Patents and Trademarks